Sept. 7, 1937.  C. S. JENNINGS  2,092,396
CONVEYER SYSTEM
Filed Oct. 20, 1934   3 Sheets-Sheet 2

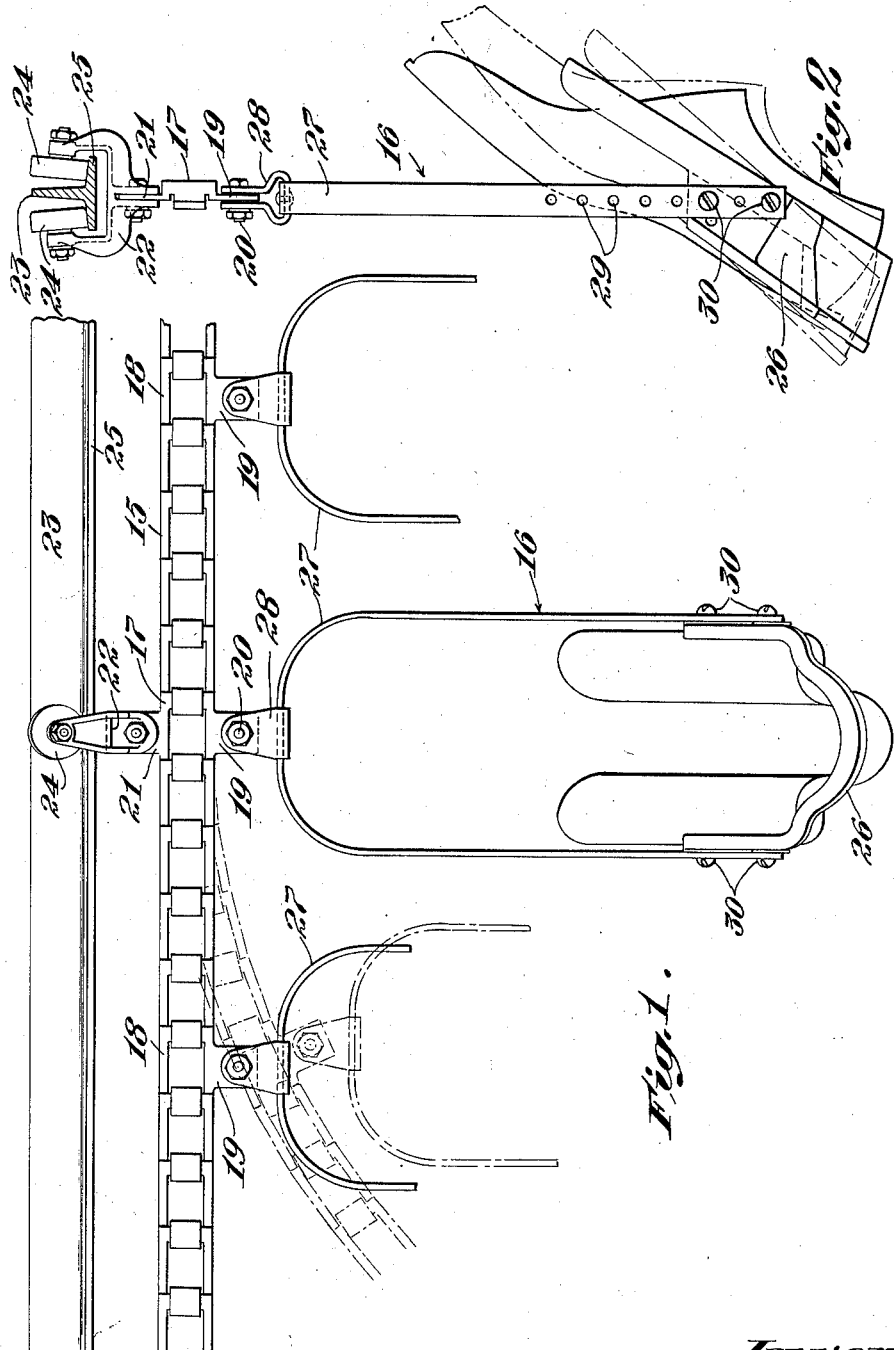

Inventor
Chester S. Jennings
by Roberts, Cushman & Woodberry
att'ys.

Sept. 7, 1937.　　　　C. S. JENNINGS　　　　2,092,396
CONVEYER SYSTEM
Filed Oct. 20, 1934　　　3 Sheets-Sheet 3
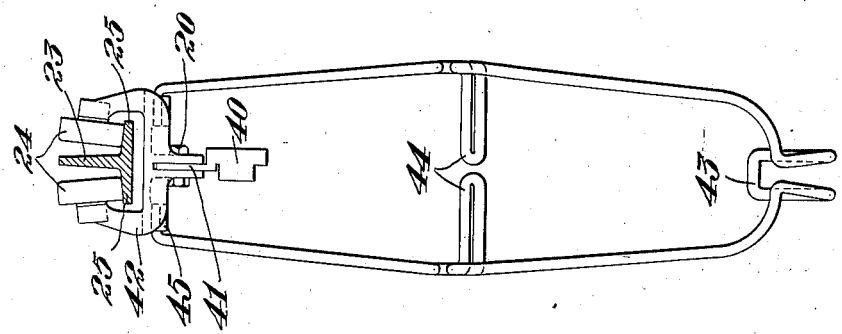
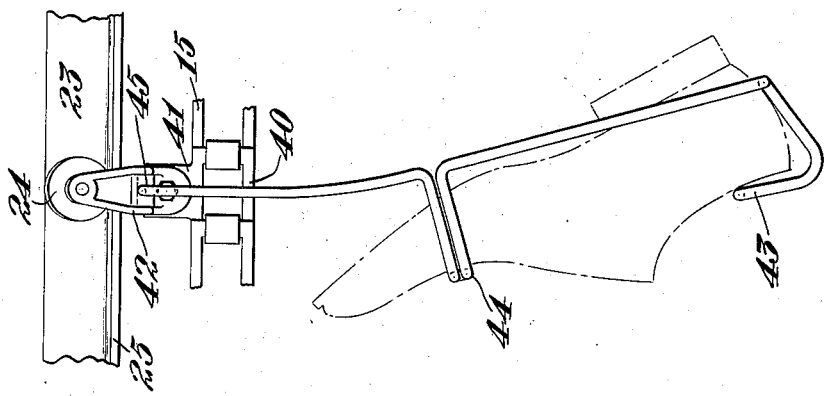
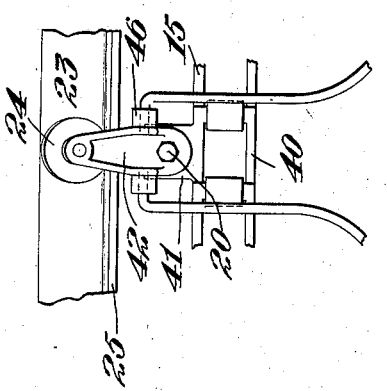

Patented Sept. 7, 1937

2,092,396

UNITED STATES PATENT OFFICE 2,092,396

CONVEYER SYSTEM

Chester S. Jennings, Syracuse, N. Y., assignor to The Lamson Company, Syracuse, N. Y., a corporation of Massachusetts Application October 20, 1934, Serial No. 749,135

3 Claims. (Cl. 198—131)

This invention relates to an improvement in a conveyer system wherein the work is transported to and from the various work stations of an installation, the work being handled progressively at the work stations by operators arranged in groups, all the operators in each group performing similar operations, and in a system of manufacturing shoes thereby. Systems of this general type primarily adapted for the handling of shoes are shown for example in the patent to Frost No. 1,863,557, granted June 21, 1932, and the patent to Perry No. 1,948,127, granted February 20, 1934.

The novel features of the present invention reside in part in the provision of conveyers of the overhead type wherein the work is transported by carriers suspended from endless chains; and the structure and mode of operation of the work carriers.

These and other features will appear from an examination of the following description and of the accompanying drawings which form a part of the description and in which:

Fig. 1 is an enlarged view of a portion of a conveyer provided with a shoe carrier of the overhead type;

Fig. 2 is a side elevation of such shoe carrier;

Figure 3:
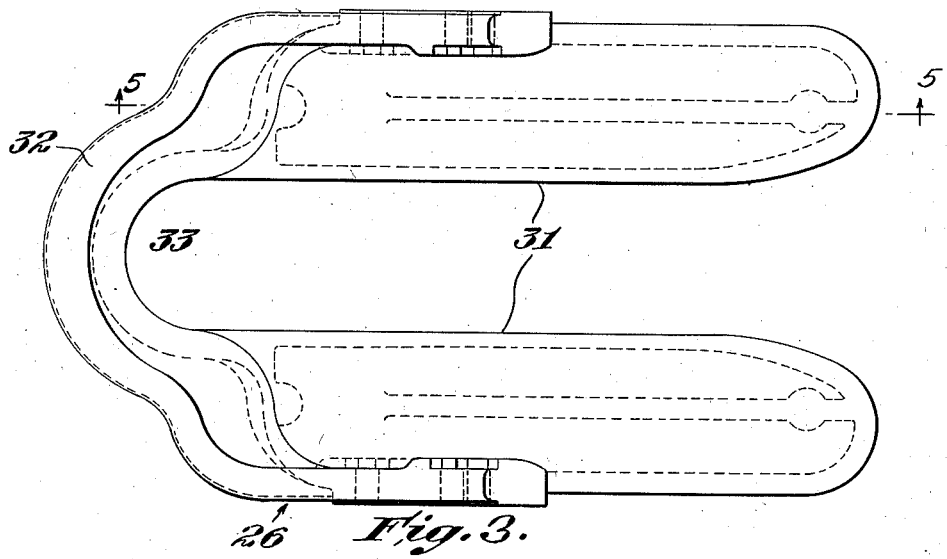
Figure 4:
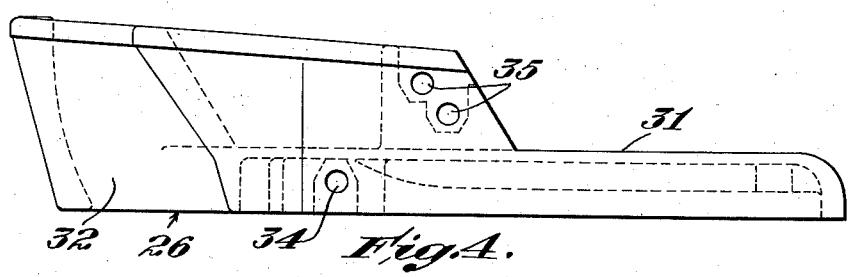
Figure 5:
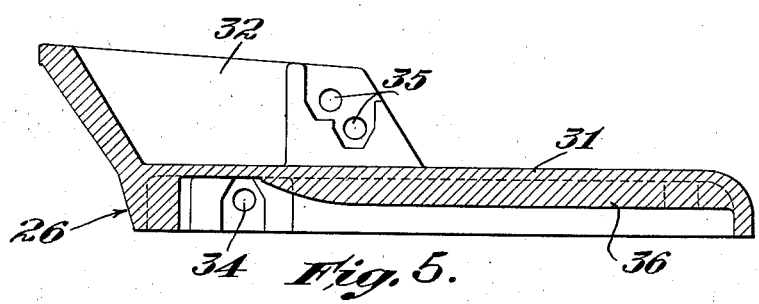

Figs. 3, 4 and 5 illustrate the shoe supporting rack of the carrier shown in Figs. 1 and 2, Fig. 5 being a sectional view taken along the line 5—5 on Fig. 3;

Figs. 6 and 7 illustrate in side and front elevation respectively another form of shoe carrier;

Fig. 8 is a side elevation similar to Fig. 6, illustrating another way of suspending the carrier from the conveyer chain.

This invention has been shown in the drawings and will be described as applied to the handling of shoes. It will be understood, however, that the invention is not limited thereto and that the conveyer mechanism may be used in many other ways for the transportation of other articles.

In the drawings are disclosed four types of conveyer mechanism which function in the same manner. Each type comprises an endless chain 15 and a plurality of work carriers. The various types differ only in the structure of the work carriers as will be set forth hereinbelow.

In the conveyer mechanism shown in Figs. 1 to 5 inclusive the work carriers 16 are adapted to support shoes either with or without lasts. The chain 15 includes a plurality of spaced links 17 and 18 which are provided with downwardly projecting tabs 19 to which the work carriers are pivotally secured as by nut and bolt assemblies 20. The links 17 are also provided with upwardly projecting tabs 21 to each of which a yoke 22 is pivotally attached. The arms of the yoke 22 extend at either side of a guide bar 23 and carry rollers 24 which rest upon the horizontal flange 25 of the bar (see Fig. 2).

The work carrier is stirrup-like in appearance and comprises a rack 26 and a hanger consisting of an inverted U-shaped strap 27 attached at its lower ends to the rack 26 and connected, midway between its ends, to a tab 19 by a clip 28. The clip is pinned to the middle of the strap and provided with holes through which the bolt of the assembly 20 passes. In the lower ends of the strap are provided a plurality of spaced apertures 29 through which set screws 30 pass into the sides of the rack 26. The provision of the spaced apertures permits adjustment of the racks to any desired height.

The rack 26 (see Figs. 3, 4 and 5) comprises a pair of paddles 31 parallelly spaced and projecting from a wall 32. The wall 32 is curved, having a central depression 33 in alignment with the space between the paddles. At each side of the rack are formed holes, one, 34, in the base and two, 35 in the walls, which holes are adapted to receive the screws 30. The rack 26 is preferably made in one piece and may be of a molded phenolic condensation product. It is here so shown and in order to reduce its weight the under sides of the paddles 31 are concave, suitable central ribs 36 being provided as reinforcement.

The shoe is carried on the rack as shown in dotted lines on Fig. 2 with the cone of the last or upper of the shoe inserted in the space between the paddles 31 so that the sides of the shoe rest on the paddles and the heel of the shoe rides in the depression 33. The plane of the rack may be determined by selecting the holes 35 to receive the screws as shown in full and dotted lines on Fig. 2.

Figs. 6, 7 and 8 illustrate a shoe conveyer having another form of carrier suspended from the endless chain 15. The links 40 to which the carrier is secured are provided with upwardly extending tabs 41 to which yokes 42 are pivotally connected by nut and bolt assemblies 20. The yokes 42, like the yokes 22, carry rollers 24 which rest upon the horizontal flange 25 of the guide bar 23. The work carrier consists of a length of looped wire, bent intermediate its ends to form a laterally and upwardly extending tongue 43 and, approximately midway between the tongue 43 and the ends, to form a pair of laterally and inwardly extending tongues 44. The ends of the wire may be inserted into pockets 45 formed in the sides of the yoke 42 if the carrier be swung longitudinally of the chain (see Figs. 6 and 7) or into pockets 46 formed in the front and rear of the yoke if the carrier is swung transversely of the chain (see Fig. 8). The shoe, as shown in Fig. 6, rides in the carrier with the heel resting against the tongue 43 and the toe resting against the tongues 44.

While certain embodiments of the conveyer mechanism have been described it will be understood that I am not limited thereto and that other embodiments and applications may be made without departing from the spirit and scope of the invention as set forth in the following claims.

I claim:

1. In a conveyer of the overhead type comprising a guide bar, yokes engaging said bar, an endless chain and means connecting said yokes to said chain whereby the chain is supported and its travel is guided by the bar, work carriers pivotally suspended from said chain, each carrier comprising a looped strap and a shoe rack fixed to and between the lower ends of the strap and including a pair of parallelly spaced inclined paddles, a wall connecting the lower ends of the paddles and means for securing the shoe rack to the strap at various inclinations whereby a shoe may be placed on the rack with the sides thereof resting on the paddles, the heel thereof resting against the wall and the upper thereof inserted in the space between the paddles.

2. In a conveyer of the overhead type comprising a guide bar, yokes engaging said bar, an endless chain and means connecting said yokes to said chain whereby the chain is supported and its travel is guided by the bar, work carriers pivotally suspended from said chain, each carrier comprising a looped strap, the ends of the strap being brought together and bent upwardly to form a tongue and the sides being bent to form tongues which extend laterally and inwardly whereby a shoe placed on the work carrier is supported at the heel by the first-named tongue and at the toe by the second-named tongue.

3. In a conveyer of the overhead type comprising a guide bar, yokes engaging said bar, an endless chain, means connecting said yokes to said chain whereby the chain is supported and its travel is guided by the bar, work carriers pivotally suspended from said chain, each carrier serving to support a shoe and comprising a loop structure including a supporting element having shoe engaging surfaces extending inwardly from its opposite sides and its lower extremity, the lower supporting surface shaped to receive the heel of a shoe, said surfaces having portions thereof disposed approximately in a plane bearing an acute angular relationship to the vertical plane whereby the shoes are held in an angular relationship to said vertical plane during the travel of the work carrier.

CHESTER S. JENNINGS.